W. O. TAYLOR.
TACK WEIGHING MACHINE.
APPLICATION FILED NOV. 21, 1908.
946,171.
Patented Jan. 11, 1910.
4 SHEETS—SHEET 1.
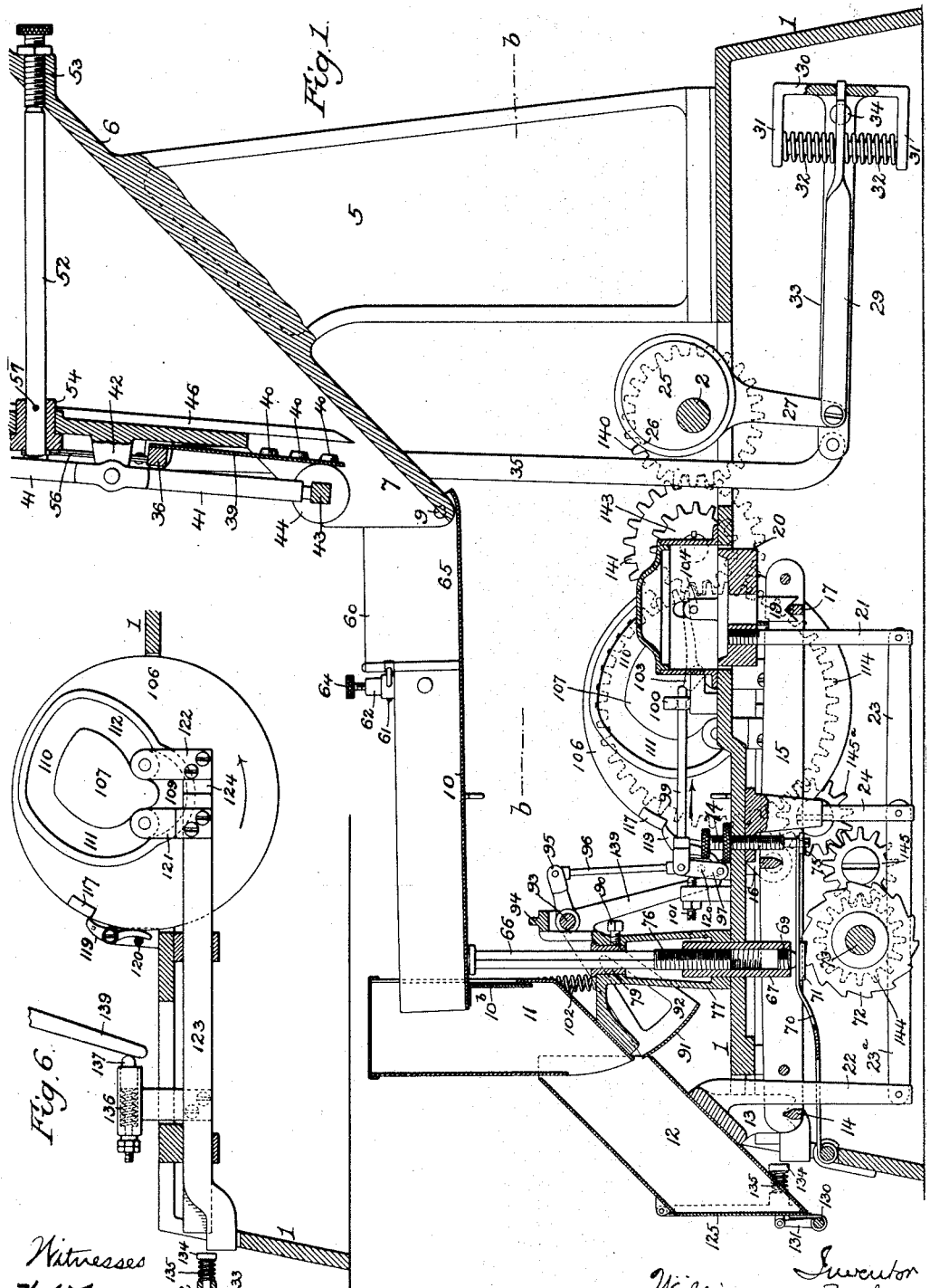
Witnesses
K. W. Turner
Harry L. Smith
Inventor
William O. Taylor
by his Attorneys
Smith & Frazier

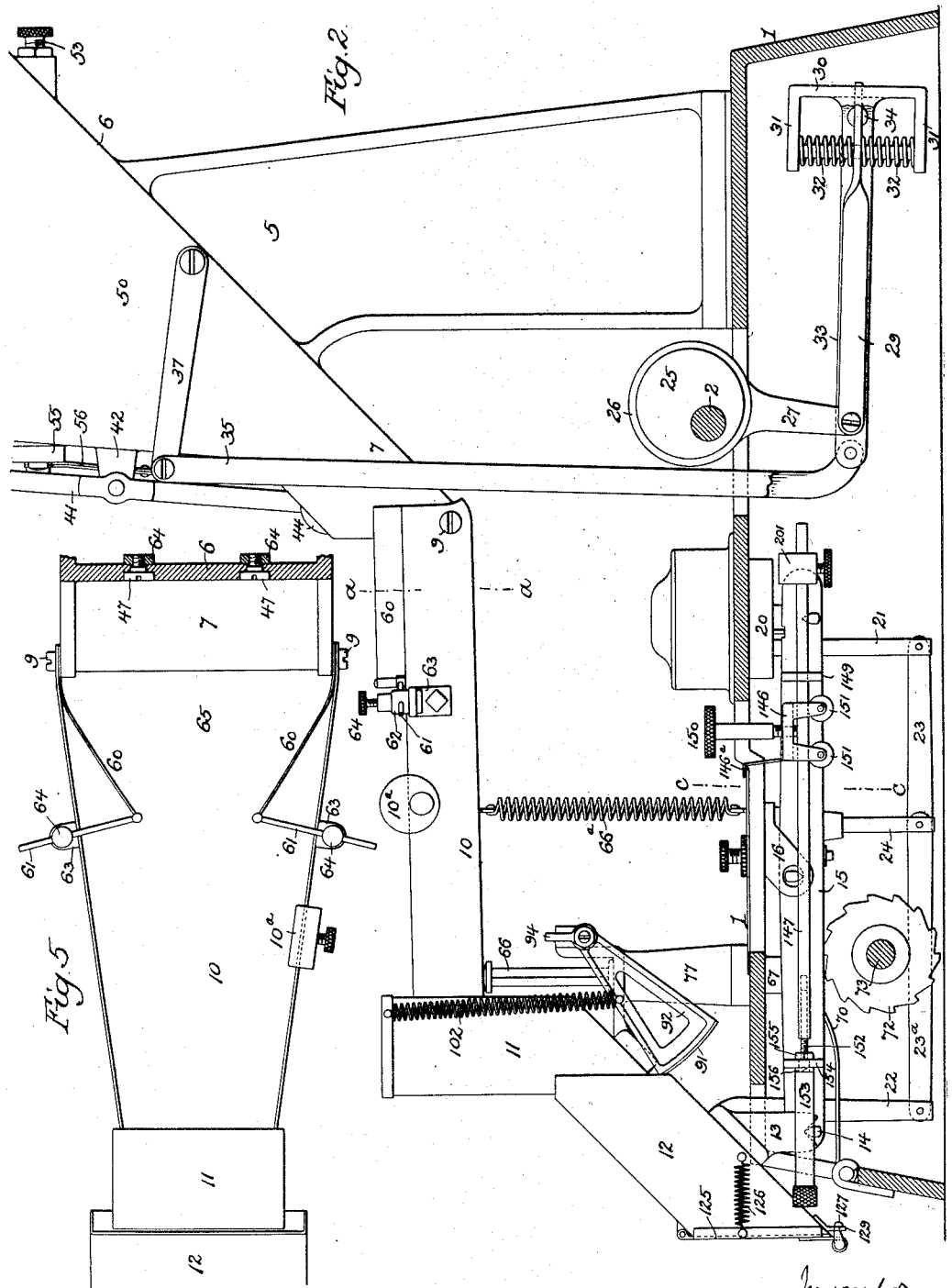

W. O. TAYLOR.
TACK WEIGHING MACHINE.
APPLICATION FILED NOV. 21, 1908.
946,171.
Patented Jan. 11, 1910.
4 SHEETS—SHEET 3.
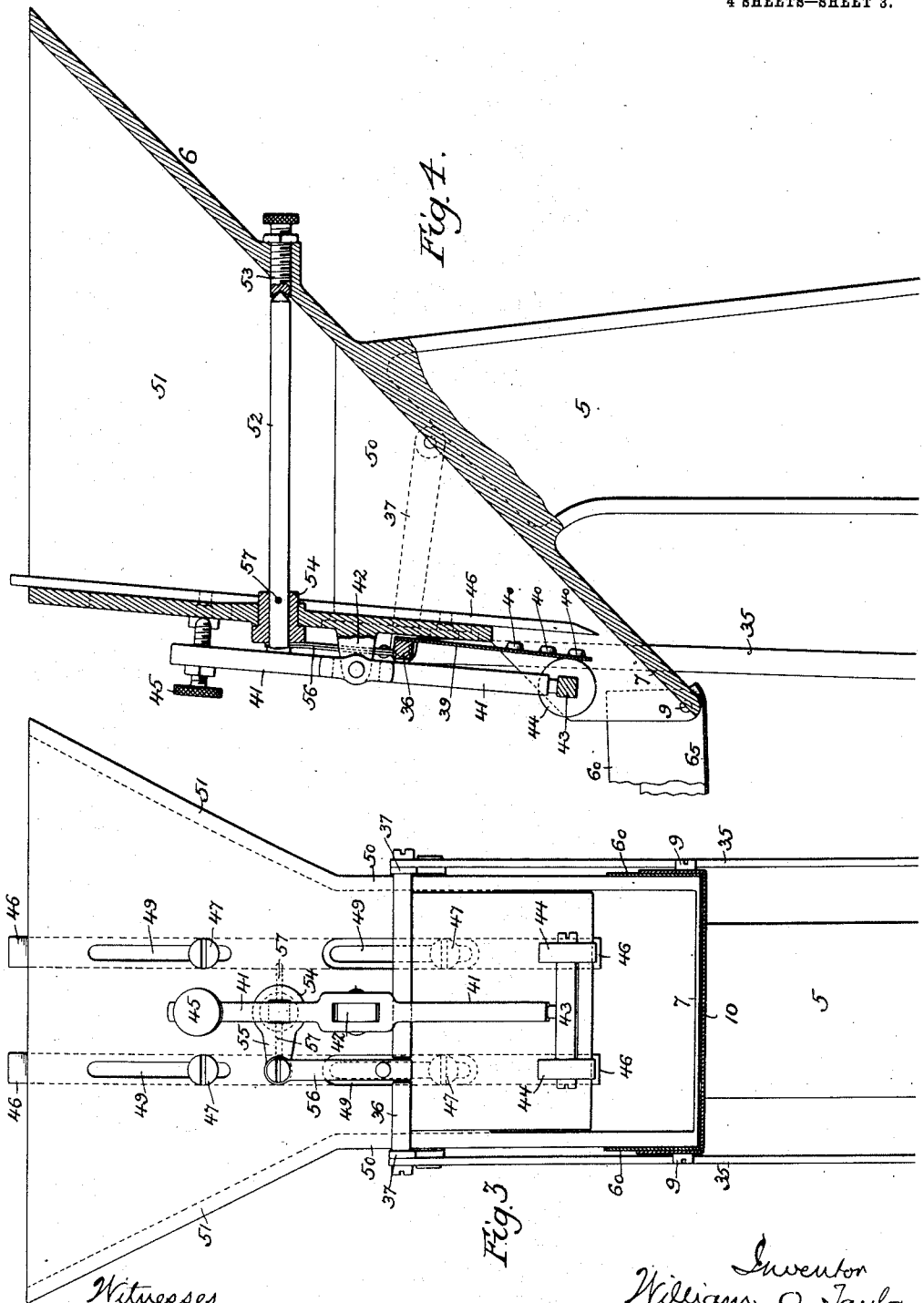

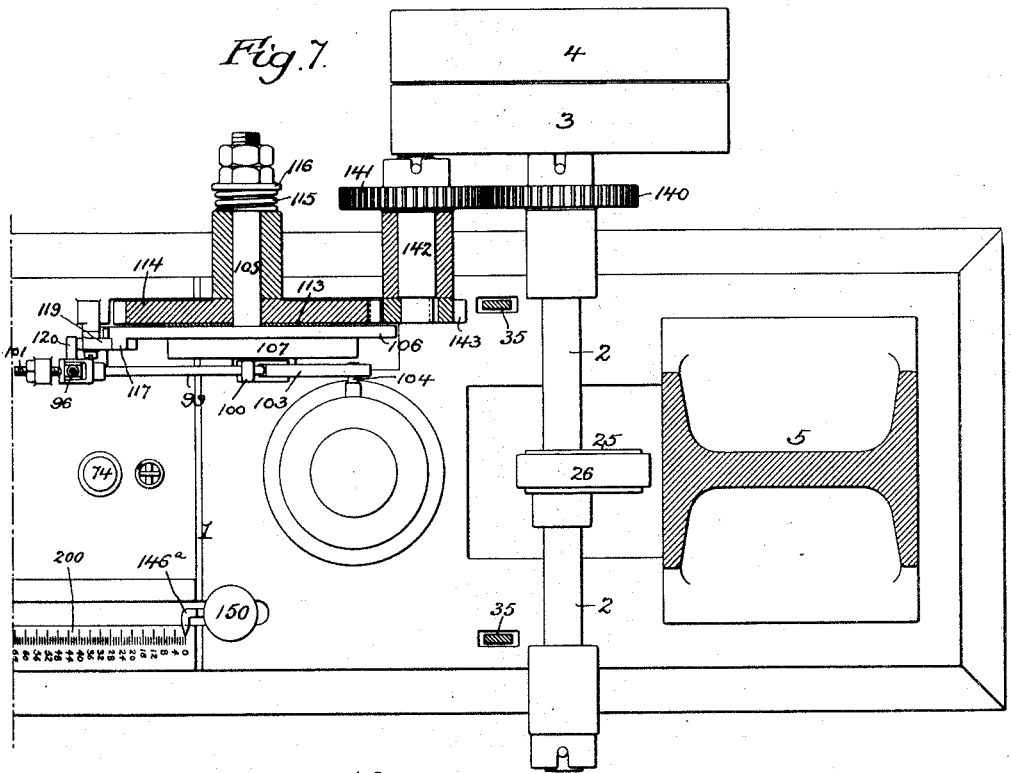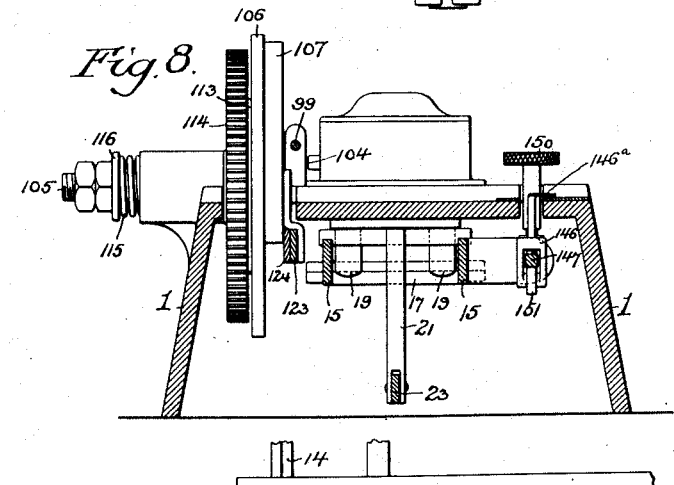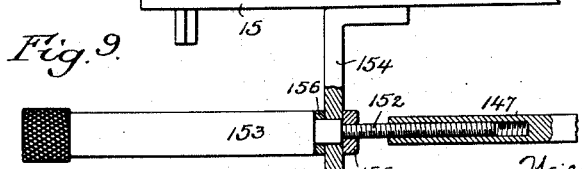

UNITED STATES PATENT OFFICE.

WILLIAM O. TAYLOR, OF LIMERICK SQUARE, PENNSYLVANIA, ASSIGNOR TO TAYLOR & COMPANY, OF LIMERICK SQUARE, PENNSYLVANIA, A FIRM.

TACK-WEIGHING MACHINE.

946,171. Specification of Letters Patent. Patented Jan. 11, 1910.

Application filed November 21, 1908. Serial No. 463,806.

*To all whom it may concern:*

Be it known that I, WILLIAM O. TAYLOR, a citizen of the United States, residing in Limerick Square, Montgomery county, Pennsylvania, have invented certain Improvements in Tack-Weighing Machines, of which the following is a specification.

The object of my invention is to provide a machine for accurately and automatically weighing tacks, shoe nails, brads, rivets, screws, and other like articles, which, because of their having points or heads, or both points and heads, have a tendency to collect in entangled masses and thus prevent the proper feeding of the same to the weighing appliances. This object I attain in the manner hereinafter set forth, and in the specification and claims, I will, for convenience, use the term "tacks" as indicating the articles to be weighed, without, of course, intending thereby to limit the claims in this respect.

In the accompanying drawings—Figure 1 is a view, partly in elevation and partly in longitudinal section, of a tack weighing machine constructed in accordance with my invention; Fig. 2 is a side elevation showing the bed plate and certain shafts in section, and omitting, in order to prevent confusion, certain of the devices on the far side of the machine; Fig. 3 is a view showing a certain equalizing trough in transverse section on the line *a—a*, Fig. 2, and the front end of the feed hopper in elevation; Fig. 4 is a central vertical section of the feed hopper showing, partly in section and partly in elevation, some of the devices which coöperate with said feed hopper in order to effect the proper delivery of the tacks therefrom; Fig. 5 is a plan or top view of the equalizing trough and certain elements of the weighing mechanism, this view also showing, in horizontal section, part of the front of the feed hopper and certain appurtenances of the same; Fig. 6 is a view, partly in side elevation and partly in longitudinal section, illustrating certain elements of the machine in a different position from that shown in Fig. 1; Fig. 7 is a top or plan view on the line *b—b*, Fig. 1; Fig. 8 is a transverse section on the line *c—c*, Fig. 2, and Fig. 9 is a longitudinal section on an enlarged scale of certain devices constituting part of the means employed for compensating the scale.

In the drawings, 1 represents the base or bed plate of the machine, which is provided with suitable bearings for the primary driving shaft 2, the latter being provided with fast and loose pulleys 3 and 4, as shown in Fig. 7, or otherwise equipped for the application of the motive power thereto.

Upon a suitable post or standard 5 secured to the base plate 1, is mounted, at a suitable distance above said base plate, a hopper 6 in which the tacks to be weighed are deposited in bulk, this hopper having a discharge spout 7 upon which is pivotally mounted, at 9, the rear end of an equalizing trough 10, the forward end of said trough projecting and discharging into a collector box 11, which, in turn, discharges at intervals into the scale pan 12 of the weighing mechanism, said scale pan having depending lugs 13 which are mounted upon the projecting ends of a knife-edged bar 14 secured to the forward end of a double scale beam 15. The latter has knife-edge bearings mounted in lugs 16 depending from the base plate and is provided, near its rear end, with a knife-edged bearing 17, upon which rest lugs 19 on the weight pan 20, said weight pan also having a depending rod 21 which is connected to an arm 23, pivoted to a rod 24 depending from the base plate, a depending arm 22 on the scale pan, being connected to a similar arm 23ª in order to prevent or restrict swinging movement of either the scale pan or weight pan on their respective knife-edged bearings.

The primary shaft 2 is provided with an eccentric 25 or equivalent device for transforming rotary into vibrating or reciprocating movement, the sleeve 26 of this eccentric having an arm 27 which is connected to a lever 29, the latter being fulcrumed in a yoke 30 which has upper and lower arms 31, as shown in Fig. 1, coiled springs 32 being interposed between these arms and the lever 29 in order that the vibrating movements of the latter may be transmitted to the yoke through the medium of these springs. In addition to the arms 31 the yoke 30 has, at each side, an arm 33, fulcrumed at 34 to the base plate of the machine and connected by a link 35 to one end of a transverse bar 36, which extends across the front of the hopper 6 and is pivotally mounted at each end in a radius bar 37 pivotally mounted upon the side of the hopper, as shown in Fig. 2.

Secured to and depending from the transverse bar 36 is a plate 39 which I term a segregating plate and which partially closes the passage through the downwardly inclined spout 7 of the hopper and has, on its inner face, projecting studs or lugs 40, as shown in Fig. 1, so that as the mass of tacks contained in the hopper, in its attempt to pass downwardly through the spout 7, presses upon the inner face of said plate 39, the mass will be broken up or divided into component units by the action of the inner face of said reciprocating plate and its projecting lugs, the detached units being caused by the movement of the plate to pass down the discharge spout 7, and the delivery of compact and entangled masses of tacks from the spout of the hopper being prevented.

As some kinds of tacks, however, require a more direct and positive action for this purpose than others, I provide for varying the angle of the plate 39 in respect to the line of flow of the tacks, this result being accomplished by means of a lever 41, which is pivoted to a lug 42 projecting from the front of the hopper, and has, at its lower end, a cross head 43 carrying anti-friction rollers 44, which press upon the outer face of the plate 39, the upper end of the lever carrying an adjusting screw 45, by the manipulation of which the lower end of the lever and its rollers 44 are permitted to swing away from the mouth of the hopper to a greater or less extent, and the plate 39 thereby caused to move either in a substantially vertical position, in which it offers the maximum of opposition to the downward flow of the tacks, or permitted to swing outwardly in the direction of such flow, such recession of the plate moderating its action upon the flowing mass of tacks in proportion to the extent of such recession.

The area of the delivery mouth or throat of the hopper 6 may be restricted by means of one or more fingers 46 located on the inside of the front plate of the hopper and held in place thereon by screws 47, which pass through slots 49 in said front face, as shown in Fig. 3, the fingers 46 being thereby rendered vertically adjustable in order that their lower ends may be so disposed in respect to the inclined bottom of the hopper as to retard the flow of the tacks and prevent the same from contacting with the inner face of the reciprocating plate 39 with such force as to cause injury to the tack points or prevent free movement of the plate.

The lower portion of the hopper has straight sides 50 and its upper portion has flaring sides 51, as shown in Fig. 3, and, in order to prevent the mass of tacks from bridging in the lower portion of the flaring member of the hopper, I mount therein a longitudinal shaft 52 of square or other polygonal cross section, the rear end of this shaft being preferably coned and adapted to a socket bearing in a screw 53 at the rear of the hopper, while the front end is secured to a head 54 which is free to rock in an opening in the front of the hopper and has secured to or formed in one piece with it, an arm 55 which is connected by a strap 56 or other suitable connection to the bar 36 at the front of the hopper.

The rocking movement of the shaft 52 serves to keep the tacks in the lower portion of the flaring member of the hopper in a state of agitation and prevents bridging action of the same in this portion of the hopper, and in order to assist in the attainment of this result the pin 57 whereby the head 54 is secured to the shaft 52 may project laterally beyond said head on the inside of the hopper, as shown by dotted lines in Fig. 3, in order to have a still greater agitating effect upon the tacks which occupy a position in contact with or close to the front of the hopper.

In addition to its segregating function the plate 39 also acts as a feed regulator, for the nearer its reciprocating movement approaches the vertical the closer will its lower edge approach the bottom of the feed spout 7, and the greater the angle of its reciprocation in respect to the vertical the farther will its lower edge be removed from the bottom of the feed spout when the plate is at the lower limit of its movement.

With short, freely flowing tacks the reciprocating plate may constitute the sole means of regulating the feed, but in dealing with longer or less freely flowing tacks the action of the plate alone is not always sufficient to insure an approximately uniform volume of flow onto the head of the trough 10, the flow having a tendency to vary within wide limits, and I therefore find it advisable to provide, at the head of the trough 10, for use in such cases, a reservoir 65, into which the tacks are fed from the spout 7 and in which they can accumulate during periods of flood in the flow, these accumulations being gradually depleted during those times when the tacks are being fed from the spout 7 at a lesser rate of flow than is needed to properly supply the weighing apparatus. This reservoir is provided in the following manner: At each side of the upper or receiving end of the trough 10 is an internal wing plate 60 whose forward end is connected to a rod 61, the latter being adjustable back and forth through a stud 62 pivotally mounted upon a bracket 63 on the side of the trough, a clamping screw 64 serving to retain the rod 61 in any position to which it may be adjusted in respect to the stud 62. By this means there is formed at the upper end or head of the trough 10 a reservoir 65 which regulates the feed of tacks to said trough 10, the delivery mouth or throat of this reservoir being susceptible of having its area increased or diminished by moving the forward ends of the wing plates 60 from or toward each other to an extent demanded by the character of the tacks acted upon and the required rate of flow of the same into the trough. The forward end of the trough 10 rests upon, and is, by means of a coiled spring 66ª (Fig. 2), held in contact with, the top of the upper member 66 of a two-part shaker rod whose lower member 67 carries a plug 69, resting upon an arm 70, which is suitably pivoted to the front portion of the base plate 1 of the machine and carries on its underside a tappet 71 for the action of the teeth of a rotating tappet wheel 72 mounted upon a transverse shaft 73, as shown in Fig. 1, whereby, as said tappet wheel is rotated, rapid vertical reciprocations of relatively limited extent will be imparted to the two-part rod 66—67, and by it transmitted to the trough 10, in order to cause a constant agitation of the tacks contained therein, which will serve to cause said tacks to flow forwardly down the trough and will spread or distribute them into a single layer extending practically throughout the width of the trough, the latter thus acting as an equalizer and providing for a substantially uniform feed of the tacks into the collector box 11. To prevent escape of tacks from the collector box 11 through the opening in said box which receives the delivery end of the trough 10, the latter is provided with a depending apron 10ᵇ, which serves to close said opening in all positions of vibration of the trough.

The extent of vertical reciprocating movement of the shaker rod and consequently the force of the vibrations imparted to the trough 10 may be readily governed by raising or lowering the rear end of the arm 70 through the medium of an adjusting screw 74 having a collar 75 upon which said rear end of the arm 70 rests, turning of the adjusting screw in one direction serving to lessen the effect of the teeth of the tappet wheel upon the tappet 71, and movement in the opposite direction serving to increase such effect. The spring 66ª tends to cause smoothness of vibration by preventing fluttering due to a slow return of the vibrating parts.

In order that a substantially uniform single layer of tacks may be caused to flow continuously from the discharge end of the trough 10 into the collector box 11, it is advisable that means be provided whereby, as the volume of tacks which is being fed into the trough from the reservoir 65 is increased or diminished to meet requirements, the velocity of the forward movement of the tacks through the trough may be varied and such variation of velocity I effect by varying the angle of downward inclination of the trough 10. This can be readily accomplished by turning the upper member 66 of the two-part shaker rod, said upper member having its lower portion threaded as shown at 76, for adaptation to an internally threaded opening in the lower member 67 of the rod, which is of square or other polygonal form externally, and is adapted to an opening of like form in the base of the standard 77 which carries the collector box 11. The upper member of the shaker rod is also, by preference, of square or other polygonal cross section and is adapted to a sleeve or bushing 79, which fits into the upper portion of the standard 77 and can be secured against turning therein by means of a set screw 90. This screw is loosened to permit turning of the upper member of the shaker rod in respect to the lower member, in order to impart the desired angle of inclination to the trough 10 and is then tightened to prevent turning movement of either member of the rod, whereby, when the trough is once set at the desired angle of inclination, accidental change of this angle cannot be effected.

It is part of the duty of the attendant in charge of a tack weighing machine to deposit the weighed charges of tacks in the receptacles in which they are to be sold and to close said receptacles, consequently the machine must be so set and operated that the number of weighing operations which it performs in a minute will not exceed the capacity of the attendant to fill and close the receptacles for the weighed charges. This implies such a uniform and regulated flow of tacks to the scale pan that the weighing operations will not exceed or fall below the desired number per minute, consequently an effective tack-weighing machine must provide not only for a uniform flow to produce a given number of weighing operations per minute but also for the accurate regulation of such flow to accord with the desired weight of the charge which, as before noted, may vary within wide limits depending upon the different classes of tacks which have to be weighed.

One feature of my invention therefore comprises the means described for effecting such accurate and regulable feeding of the tacks to the scale pan of the weighing machine, the operation being as follows: The tacks are deposited in bulk in the hopper 6 and naturally seek the discharge spout 7 of the same because of the inclined bottom and sides of the lower portion of the hopper. The restraining fingers 46 are set to regulate, in a measure, the weight of pressure of tacks against the segregating plate 39, such setting depending upon the character of the tacks to be weighed and the relative degree of freedom with which they can flow past one another when in mass. The character of the tacks under treatment and the required rate of flow also determines the angle of adjustment of the segregator plate 39, the width of the delivery mouth or throat of the reservoir 65 at the head of the trough 10, the angle of inclination of said trough and the extent of vibration of the same, and, these adjustments having been effected and the scale beam properly weighted and compensated, the machine is set in operation by imparting power to the primary shaft 2. The front of the mass of tacks passing through the hopper into the upper portion of the spout 7 is acted upon by the reciprocating plate 39 and its projecting lugs 40 with the effect of breaking up the masses of tacks and causing the tacks to flow freely down the spout 7 and into the reservoir 65. If the flow from the feed spout into said reservoir exceeds the rate of delivery of the tacks from the contracted mouth of the latter, the tacks will accumulate in the reservoir and back up into the feed spout 7 and will consequently offer a greater and greater resistance to the descending movement of the plate 39, the throw of which will be accordingly shortened or arrested altogether, the movement of the vibrating arm 29, or more or less of the complete movement of the same, being devoted to the compression of the springs 32 and corresponding reduction in the extent of vibration of the yoke 30. The feed of tacks from the spout 7 is thereby checked, or, if necessary, completely arrested until the supply in the reservoir 65 has been depleted sufficiently to lessen the resistance to the reciprocation of the plate 39, whereupon such movement will be resumed or increased and the flow of tacks from the hopper again started or increased.

It should be noted that the bridge-preventing bar 52 receives its movement from the same source as the segregating plate 39 and acts only in unison with it, with the result that when there is a full supply or glut of tacks in the spout 7 there can be no bridge existing above that point and there is, therefore, no need of any agitation of the tacks at the bridging point; and the automatic lessening or entire stopping of the movement of the plate 39 and bar 52 reduces to a minimum any tendency to blunt or injure the sharp points of tacks lying in contact with these members of the machine.

The flow of tacks from the reservoir 65 of the trough 10 is free to expand as soon as it leaves the contracted mouth of said reservoir and the shaking movement of the trough tends to cause such spreading of the flow as to separate the tacks from one another and provide, at the delivery end of the trough, an evenly distributed single layer of tacks which will, therefore, flow in a substantially uniform stream into the collector box 11 and thence into the scale pan. To further assist in securing a uniform single layer discharge of tacks to the collector box 11 the equalizer trough 10 is provided with converging side walls, as shown in Fig. 5, which have the effect of narrowing the stream of tacks flowing through the trough and thereby counteracts the thinning out or separation of the units composing the stream or layer, which would otherwise result from the gradually increasing velocity of forward movement of the tacks due to the increasing length of the vibrations as the free end of the trough is approached. Even in spite of these precautions, I find that the tacks have a tendency to seek one side of the trough more than the other, due possibly to the fact that the bottom of the trough is not perfectly horizontal in a transverse direction. When this tendency is once established it can be corrected by applying to that side of the trough at which the flow is lightest a weight $10^a$ which is adjustable longitudinally in order to permit such location of the same on the trough as may best correct the evil which it is intended to remedy.

The trough 10 delivers the tacks constantly into the collector box 11 and from the latter they pass into the scale pan 12 but while the feed of tacks into the box 11 is constant, the discharge therefrom must be intermittent in order to permit of the dumping of the scale pan after it has received its load and the readjustment of said scale pan for the reception of a succeeding load. For this reason, therefore, the outlet from the box 11 is controlled by a swinging valve 91 of segmental form, this valve being connected at each end to a sector 92, which sectors are secured to a rock shaft 93 mounted in bearings on a bracket 94 projecting from the post or standard 77, as shown in Fig. 1. As the outlet from the box 11 must be unobstructed during the time that the scale pan is being filled and must be closed when the scale pan has received its charge and is dumping the same and returning it to its original position, the operation of the cut-off valve 91 is placed under control of the weighing mechanism in the following manner: The rock shaft 93 is provided with an arm 95 which is connected to the upper member 96 of a toggle whose lower member 97 is pivotally mounted upon a stud on the base plate 1 as shown in Fig. 1, the pin which connects the two members of the toggle being also connected to a rod 99 which passes through a suitable guide 100 on the base plate. Normally, that is to say when the valve 91 is depressed and the tacks are being fed from the box 11 into the scale pan, the toggle 96—97 is slightly bent, the bringing of the two arms of the toggle into a straight line with one another being prevented by a set screw 101. Either or each of the valve-carrying sectors 92 is connected to a coiled spring 102 which is also connected to a suitable fixed point of support, such, for instance, as a pin on the cap or cover of the box 11 as shown in Fig. 2, the constant tendency of said spring or springs being to cause the toggle 96—97 to break and force the pin 99 in the direction of the arrow, Fig. 1, thereby permitting the valve 91 to rise and cut off the further flow of tacks from the box 11 into the scale pan. During the filling of the scale pan, however, this movement is prevented by contact of the rear end of the rod 99 with a trigger 103 having a projecting tail which can be struck and moved by a pin 104 projecting laterally from a lug on the weight pan 20 of the scale beam.

The trigger 103 has a long tail and a short member whose engaging surface contacting with the end of the toggle rod 99 is concentric with the pivot upon which the trigger swings. By using these devices as elements of the mechanism whereby the valve 91 is held in the opened position until released by the movement of the scale beam, the leverages are such that the slightest pressure of the pin 104 upon the tail of the trigger 103 is sufficient to trip the same, and in consequence, the tipping of the scale beam is not retarded to any such extent as would interfere with the accurate weighing of any desired charge deposited in the scale pan.

When the scale pan receives its predetermined load, it will depress that end of the scale beam upon which it is mounted and thus cause the rise of the weight pan 20 and the tripping of the trigger 103, and, as soon as the rod 99 is relieved from the restraint of the trigger, the toggle 96—97 can be broken and the valve 91 will be lifted by the action of the spring or springs 102 so as to cut off any further feed from the box 11 into the scale pan. It now remains only to dump the scale pan, reclose the same and again drop the valve 91 by resetting its controlling devices, and this is effected in the following manner. A shaft 105, mounted in suitable bearings on the base plate 1, has secured to its inner end a disk 106 having upon it a grooved cam 107 with two dwell portions 109 and 110 and two active portions 111 and 112, as shown in Fig. 6. This disk 106 has a friction pad 113, which is held in frictional contact with the inner face of a constantly rotating spur wheel 114, by means of a coiled spring 115, interposed between the bearing for the shaft 105 and an adjustable washer or nut 116 on a theaded end of said shaft, whereby adjustment of said nut will provide for any desired degree of pressure of the friction pad 113 against the face of the spur wheel 114 and the application of any desired amount of frictional rotative force by said spur wheel to the disk 106. During the filling and weighing operations the disk is held against rotation by contact of a lug 117 on its face with a trigger 119 pivoted to a suitable stud on the base plate. When, however, the toggle 96—97 is broken by the operation of the scale, a pin 120 on the toggle arm 97 strikes the tail of the trigger 119 and operates the latter so as to release the lug 117 from its restraint, whereupon the cam disk 106 begins to rotate in the direction of the arrow, Fig. 6. The grooved cam 107 thereupon acts upon studs or antifriction rollers projecting into its groove from arms 121 and 122, the arm 121 projecting from a slide bar 123 and the arm 122 projecting from a slide bar 124, both bars being suitably guided in bearings on the base plate 1, as shown in Fig. 6.

The scale pan has an inclined bottom and the delivery end of said scale pan is normally closed by means of a pivoted and swinging flap 125 which is rendered normally self-closing by means of a coiled spring 126 connecting pins or studs on the scale pan and flap as shown in Fig. 2. The tension of this spring may or may not be sufficient to overcome the pressure of the tacks upon the flap 125 when the scale pan is loaded, consequently, during the weighing operation, the flap 125 is retained in the closed position by means of a catch 127 which engages a keeper 129 on the bottom of the scale pan, as shown in Fig. 2. The catch 127 is secured to a rock shaft 130 mounted in suitable bearings on the flap 125 and having an arm 131 to which is pivoted a rod 132 (see Fig. 6), this rod passing through a suitable guide 133 on the flap 125 and having a head 134 which is normally pressed inward by a coiled spring 135 so as to maintain the catch 127 in locking engagement with its keeper 129. When, however, the disk 106 begins to rotate in the direction of the arrow, Fig. 6, the first effect of this movement is to cause the acting portion 111 of the cam groove to thrust forwardly the bar 123 and cause the front end of said bar to strike and push outwardly the head of the bolt 132, thus tripping the catch 127 and pushing open the flap 125 of the scale pan so as to permit the latter to discharge its load. The stud or roller of the bar 123 then enters the dwell portion 110 of the cam groove and the flap 125 is held open until all of the load of tacks has been discharged from the scale pan, whereupon said stud or roller enters the portion 112 of the cam groove and the bar 123 is retracted so as to permit the reclosing and relatching of the flap. During the half revolution of the cam disk necessary to effect these movements the bar 124 has remained in a quiescent position owing to the fact that its stud or roller has been traveling in the dwell portion 109 of the cam groove, but, as soon as the above described operations have been completed, the portion 111 of the cam groove begins to act to retract the bar 124. Said bar 124 has a hollow stud 136 which carries an adjustable and spring-pressed plug 137 and when the cut-off valve 91 is in the closed or elevated position, this plug contacts, as shown in Fig. 6, with an arm 139 formed on, secured to, or moving with one of the valve-carrying sectors 92, as shown in Fig. 1. When, therefore, the bar 124 is moved rearwardly, this arm 139 is swung from the position shown in Fig. 6 to that shown in Fig. 1, thereby opening or lowering the cut-off valve 91 and moving the rock shaft 93 so as to raise the arm 95 and reset the toggle 96—97, and as the weight pan 20 of the scale dropped when the scale pan discharged its load, the toggle will be held in its reset position by reëngagement of the trigger 103 with the end of the toggle rod 99. The resetting of the toggle releases the tail of the trigger 119 from the restraint of the pin 120 and said trigger therefore resumes its position for reëngagement with the lug 117 on the cam disk 106 when said cam disk has completed a full revolution. The final portion of the revolution of the cam is devoted to imparting forward movement to the bar 124 so as to retract the stud 136 and its plug 137 and thereby permit of the closing of the valve 91, when the scale pan 12 has received its next charge.

Rotative movement may be imparted to the cam-disk-driving spur wheel 114 and tappet shaft 73 from the primary shaft 2 by any desired system of power-transmitting devices. In the present instance I have shown for this purpose a train of spur wheels, the same comprising a spur wheel 140 on the shaft 2 meshing with a spur wheel 141 on a short shaft 142 which is mounted in a bearing on the base plate 1 and is provided with a spur pinion 143 in mesh with the spur wheel 114, the latter driving a spur wheel 144 on the tappet shaft 73 through the medium of two intervening and intermeshing pinions 145 and 145ª, as shown in Fig. 1.

In weighing tacks or other material which is fed in a stream into the scale pan from a valve collector box, the effective weight of material upon the scale beam at the instant of closing the valve is always somewhat less than the required weight of material in order to compensate for the weight of the flowing stream between the scale pan and the cut-off valve when the latter is closed by the tipping of the scale beam. The weight of this flowing stream, will vary according to the rate or volume of flow, and, in a machine for weighing tacks, the rate of flow will necessarily have a wide variation, say from an ounce to sixteen ounces for each weighing, but the operator can take care of each weighing whether light or heavy, in approximately the same length of time, hence in a given length of time there will be the same number of weighings, whether each is light or heavy.

As the means which I have provided for feeding the tacks to the scale pan give a uniform rate of flow with any given character of tack, it only becomes necessary to compensate for different rates of flow, and not for individual weighings, and this result I attain in the following manner. A weight, represented at 146 in Fig. 2, is mounted so as to slide upon a rod 147 which is also free to slide in a bearing 149 on one side of the scale beam. A thumb-screw 150, which serves to secure the weight in any desired position upon the rod, extends upwardly through a slot in the top of the base plate 1 where it is conveniently accessible whenever it is desired to adjust the position of the weight. Along one side of the slot is a scale 200, graduated and numbered to indicate the position at which the sliding weight should be fixed to compensate for the unweighed portion of the stream under any given rate of flow, said numbered graduations preferably indicating ounces per minute. A pointer 146ª carried by the sliding weight and extending over the graduated scale assists in accurately locating the position of the weight. If, for instance, it is required to compensate for the unweighed portions of a flow giving twelve eight ounce weighings per minute the weight is moved forward on its rod until the pointer stands at the scale graduation marked 96, at which point the weight is clamped by means of the screw 150 and compensates for a flow of 96 ounces per minute, and in like manner compensations for a lighter or heavier flow can be readily effected. In order to compensate for the varying lengths of the floating stream, for the error arising from the fact that the scale beam acts more quickly when under a light load than under a heavy load and to render it possible for the operator to make any minute adjustment required while the machine is running, I provide a micrometer adjustment for the rod 147 by forming in the front end of the same a threaded opening for the reception of the reduced and threaded end 152 of a stem 153, which is confined longitudinally to a bearing 154 on the scale beam by means of a nut 155 and a split washer 156, (see Fig. 9) the stem, however, being free to turn in the bearing so as to cause backward or forward movement, in respect to the fulcrum of the scale beam, of the rod 147 and the counterbalance weight 146 which has been previously adjusted thereupon and clamped thereto. The weight 201 serves as a means of effecting a true balance of the unweighted scale beam.

I claim:—

1. In a tack weighing machine, the combination of a hopper for containing the tacks, with a vibrator in said hopper for preventing the bridging of the mass of tacks therein, and means for moving said vibrator to and fro about its axis.

2. In a tack weighing machine, the combination of a hopper for containing the tacks, with a vibrator in said hopper for preventing the bridging of the mass of tacks therein, said vibrator having a horizontal axis and projecting fingers, and means for moving said vibrator to and fro about its axis.

3. In a tack weighing machine, the combination of a hopper for containing the tacks, with a vibrator therein for preventing the bridging of the mass of tacks, means for moving said vibrator to and fro about its axis, and means whereby such movement is decreased when the resistance to the movement increases and is increased when the resistance to the movement decreases.

4. In a tack weighing machine, the combination of a hopper for containing the tacks, with means for engaging the units composing the forward portion of the mass of tacks in the hopper whereby said means serve to break up said mass.

5. In a tack weighing machine, the combination of a hopper for containing the tacks, with a movable plate acting on the forward portion of the mass of tacks in the hopper and serving to break up said mass, said plate having projections on that side which is in contact with the mass of tacks.

6. In a tack weighing machine, the combination of a hopper for containing the tacks, with a movable plate acting on the forward portion of the mass of tacks in the hopper and serving to break up said mass, and means for varying the plane of movement of said plate in respect to the line of flow of the tacks.

7. In a tack weighing machine, the combination of a hopper for containing the tacks, with a movable plate acting on the forward portion of the mass of tacks in the hopper and serving to break up said mass, and means for varying the extent of movement of said plate in accordance with the amount of resistance offered to such movement by the tacks.

8. In a tack weighing machine, the combination of a hopper for containing the tacks, with a movable plate acting on the forward portion of the mass of tacks in the hopper and serving to break up said mass, means for varying the extent of movement of said plate in accordance with the amount of resistance offered to such movement by the tacks, and means for varying the plane of movement of the plate in respect to the line of flow of the tacks.

9. In a tack weighing machine, the combination of a tack-containing hopper, with a movable segregating plate for acting upon the mass of tacks at the delivery mouth of the hopper, and an adjustable backing for said plate whereby its angle in respect to the line of flow of the tacks may be changed.

10. In a tack weighing machine, the combination of a tack-containing hopper, with a movable segregating plate for acting upon the mass of tacks at the delivery mouth of the hopper, and an adjustable backing for said plate whereby its angle in respect to the line of flow of the tacks may be changed, said adjusting device having rollers for bearing on the back of the plate.

11. In a tack weighing machine, the combination of a tack-containing hopper, a vibrator therein for preventing bridging of the mass of tacks, a movable segregating plate for breaking up the mass of tacks at the delivery mouth of the hopper, and connections between said segregating plate and vibrator whereby they are caused to operate in unison.

12. In a tack weighing machine, the combination of a tack-containing hopper, a vibrator therein for preventing bridging of the mass of tacks, a movable segregating plate for breaking up the mass of tacks at the delivery mouth of the hopper, connections between said segregating plate and vibrator whereby they are caused to operate in unison, and means for regulating the movement of the segregating plate to accord with the resistance offered to such movement by the tacks.

13. In a tack weighing machine, the combination of a tack-containing hopper with a segregating plate acting to break up the mass of tacks at the delivery mouth of the hopper, an operating device for said segregating plate, and a yielding medium through which the power of the operating device is transmitted to the plate.

14. In a tack weighing machine, the combination of a tack containing hopper, a segregating plate acting to break up the mass of tacks at the delivery mouth of the hopper, a vibrating yoke connected to said plate, a vibrated lever, and an interposed elastic medium through which said lever acts upon the yoke.

15. In a tack weighing machine, the combination of a tack-containing hopper, with a feed trough for receiving the tacks from said hopper, said trough having a collecting and distributing reservoir at its head and means for restricting the discharge from said reservoir.

16. In a tack weighing machine, the combination of a tack-containing hopper, a trough for receiving the tacks from said hopper, said trough having a collecting-and-distributing reservoir at its head, and means for varying the size of the delivery mouth of said reservoir.

17. In a tack weighing machine, the combination of a tack-containing hopper, a trough having, at its head, a reservoir into which the hopper discharges, and a movable segregating plate for acting upon the mass of tacks as they pass from the hopper into said reservoir.

18. In a tack weighing machine, the combination of a tack-containing hopper, and a trough having at its head a reservoir with side members adjustable from and toward each other in order to contract or expand the outlet from said reservoir.

19. In a tack weighing machine, the combination of a tack-containing hopper, with a trough having, at its head, a reservoir whose opposite side members are movable from and toward each other at their forward ends, rods connected to said side members and engaging pivotal studs on the sides of the trough, and means for clamping said rods to said studs.

20. In a tack weighing machine, the combination of the weighing mechanism, a stationary hopper, a trough for conveying the tacks from the hopper to the weighing mechanism, means for vibrating said trough, and means for providing a variable feed of tacks from the hopper to the trough.

21. In a tack weighing machine, the combination of an inclined tack-delivering trough, with means for imparting substantially vertical vibrations thereto, and means for varying the extent of such vibrations without changing the angle of the trough.

22. In a tack weighing machine, the combination of an inclined tack-delivering trough with means for imparting substantially vertical vibrations thereto, and means for varying the angle of inclination of the trough without affecting the extent of vibration thereof.

23. In a tack weighing machine, the combination of an inclined tack-delivering trough with means for imparting substantially vertical vibrations thereto, means for varying the extent of such vibrations, and means independent thereof for varying the angle of inclination of the trough.

24. In a tack weighing machine, the combination of a vibrating tack delivering trough having sides converging toward the delivery end, and means providing a variable feed of tacks to the receiving end of the trough.

25. In a tack weighing machine, the combination of the weighing mechanism, with a vibrating trough for delivering the tacks thereto, said trough having, at the head, a reservoir, with means for regulating the area of the mouth of the latter.

26. In a tack weighing machine, the combination of a vibrating tack delivering trough with a detachable weight on the side of the same, said weight being adjustable longitudinally on the side of the trough.

27. In a tack weighing machine, the combination of a feed trough, a tappet wheel for vibrating the same, and an interposed transmitting device adjustable in length whereby it also serves to vary the angle of inclination of the feed trough.

28. In a tack weighing machine, the combination of a feed trough, a tappet wheel, an arm acted upon thereby and adjustable in respect thereto to vary the effect of such action, and a rod interposed between the arm and trough and serving to transmit the movements of one to the other.

29. In a tack weighing machine, the combination of a feed trough, a tappet wheel, an arm acted upon thereby and adjustable in respect thereto to vary the effect of such action, and a rod interposed between the arm and trough and serving to transmit the movements of one to the other, said rod being adjustable in length.

30. In a tack weighing machine, the combination of the feed trough, a tappet wheel, and a two-part rod through the medium of which said tappet wheel is caused to vibrate the feed trough, the two parts of the rod being united by a screw connection whereby said rod can be increased or decreased in length.

31. In a tack weighing machine, the combination of the feed trough, a tappet wheel, and a two-part rod through the medium of which said tappet wheel is caused to vibrate the feed trough, the two parts of said rod being united by a threaded connection, and means for preventing accidental turning of one member of the rod in respect to the other.

32. In a tack weighing machine, the combination of the feed trough, a tappet wheel, and a two-part rod through the medium of which said tappet wheel is caused to vibrate the feed trough, the two parts of said rod being united by a threaded connection, and means for preventing accidental turning of one member of the rod in respect to the other, said means having as an element a rotatable sleeve and means for clamping the same to prevent such rotation.

33. In a tack weighing machine, the combination of means for maintaining regulable but individually uniform rates of flow of the tacks to the scale pan, a scale beam, a compensating weight thereon, and an indicator scale graduated to accord with the varying rates of flow and governing the adjustment of said compensating weight.

34. In a tack weighing machine, the combination of a scale beam, a compensating weight and a threaded stem for effecting adjustment of said compensating weight on the scale beam.

35. In a tack weighing machine, the combination of a scale beam, a compensating weight, means for adjusting the same directly and means for adjusting it through the medium of a threaded stem.

36. In a tack weighing machine, the combination of a scale beam, a compensating weight adjustably mounted on a member carried by the scale beam, and means for also adjusting said weight-carrying member with the weight upon it.

37. In a tack weighing machine, the combination of a scale beam, a compensating weight, a scale beam member on which said weight is adjustable in respect to the fulcrum of the beam, and means, comprising a threaded stem, for effecting adjustment of said member with the weight upon it.

38. In a tack weighing machine, the combination of the weighing mechanism, with a valved collector box, a vibrating trough for feeding the tacks to said box, and means providing a regulable feed of tacks to said trough.

39. In a tack weighing machine, the combination of the weighing mechanism, a valved collector box, and a vibrating trough for delivering the tacks to said box, said trough having a reservoir provided with means for regulating the area of its delivery mouth.

40. In a tack weighing machine, the combination of the weighing mechanism, a valved collector box, vibrating means for delivering the tacks thereto, and toggle mechanism for retaining the valve in the open position.

41. In a tack weighing machine, the combination of the weighing mechanism, a valved collector box, means for delivering the tacks thereto, toggle mechanism for retaining the valve in the open position, and means under control of the scale beam for retaining said toggle in position corresponding to the open position of the valve.

42. In a tack weighing machine, the combination of the weighing mechanism, a valved collector box, means for delivering the tacks thereto, toggle mechanism for retaining the valve in the open position, means under control of the scale beam for retaining said toggle in position corresponding to the open position of the valve, and cam-actuated means for resetting said toggle after it has been released by the operation of the scale beam.

43. In a tack weighing machine, the combination of the weighing mechanism, a valved collector box, means for delivering the tacks thereto, toggle mechanism for retaining the valve in the open position, a trigger having a portion concentric with its pivotal axis, means whereby said trigger is caused to retain said toggle in position corresponding to the open position of the valve, and means under control of the scale beam for tripping said trigger.

44. In a tack weighing machine, the combination of weighing mechanism having a dumping scale pan, a valved collector box discharging into said scale pan, means for delivering the tacks to said collector box, means under control of the scale beam for holding the valve in the open position, and cam mechanism, for dumping the scale pan.

45. In a tack weighing machine, the combination of weighing mechanism having a dumping scale pan, a valved collector box discharging into said scale pan, means for delivering the tacks to said collector box, means under control of the scale beam for holding the valve in the open position, and frictionally-operated cam mechanism for dumping the scale pan.

46. In a tack weighing machine, the combination of weighing mechanism having a dumping scale pan, a valved collector box discharging into said scale pan, means for delivering the tacks to said collector box, means under control of the scale beam for holding the valve in the open position, and frictionally-operated cam mechanism for opening said valve and dumping the scale pan.

47. In a tack weighing machine, the combination of weighing mechanism, a valved collector box discharging into the scale pan of said weighing mechanism, means for delivering the tacks to said collector box, means under control of the scale beam for retaining the valve of the collector box in the open position, a frictionally operated cam for effecting the opening of the valve, means for retaining said cam during the time that the valve is open, and means for releasing the cam when the valve is closed.

48. In a tack weighing machine, the combination of weighing mechanism having a dumping scale pan, a valved collector box, means for delivering the tacks to said collector box, means under control of the scale beam for retaining the valve of the collector box in the open position, frictionally operated cam mechanism for opening the valve and dumping the scale pan, means for retaining the cam when the valve is open, and means whereby the cam is released when the valve is closed.

49. In a tack weighing machine, the combination of a scale pan, a vibrating delivery trough, a collector box interposed between said trough and the scale pan, a valve governing communication between the collector box and the scale pan, and having a normal tendency to close, a toggle for retaining said valve in the open position, and means under control of the scale beam for governing the breaking of said toggle and the closing of said valve.

50. In a tack weighing machine, the combination of a scale pan, a delivery trough, a collector box interposed between the two, a valve governing communication between said collector box and the scale pan and having a normal tendency to close, a toggle for retaining said valve in the open position, a rod carried by the connecting pin of said toggle, and a trigger under control of the scale beam for acting upon said rod and preventing breaking of the toggle.

51. The combination, in a tack weighing machine, of a scale pan having a pivoted discharge flap, a catch for retaining the same in the closed position, and a tripping device which acts first to release said catch and then to positively open the flap.

52. In a tack weighing machine, the combination of a scale pan, having a pivoted discharge flap, a rock shaft carried thereby and having a catch engaging a keeper on the scale pan, an arm on said rock shaft, and means for actuating said arm first to disengage the catch and then to open the flap.

53. In a tack weighing machine, the combination of a scale pan having a pivoted discharge flap, a rock shaft thereon having a catch engaging a keeper on the scale pan, an arm on said rock shaft, a rod connected to said arm and passing through a bearing on the flap, said arm having a head, and a spring interposed between said head and the bearing and serving to retain the catch in locking position.

54. In a tack weighing machine, the combination of a scale pan having a pivoted discharge flap, a spring for normally retaining said flap in the closed position, a spring catch carried by the flap and engaging a retainer on the scale pan to lock the flap in the closed position, and means for first releasing said catch and then pushing upon the flap to open the same.

55. In a tack weighing machine, the combination of a delivery trough, a dumping scale pan, a collector box interposed between the trough and the scale pan and having a valve for governing the discharge from the collector box, and a cam having a single groove which governs both the dumping of the scale pan and the closing of the valve of the collector box.

56. In a tack weighing machine, the combination of a delivery trough, a dumping scale pan, a collector box interposed between the two, a valve governing the discharge from said box, means under control of the scale beam for closing said valve, and a cam having a single groove for controlling both the dumping of the scale pan and the opening of said valve.

57. In a tack weighing machine, the combination of the scale pan, the delivery trough, a collector box interposed between the two and having a valve which governs the discharge therefrom, a rock shaft having connection with a toggle for retaining said valve in the open position, means under control of the scale beam for permitting or preventing breaking of the toggle, and an arm on the rock shaft for effecting the resetting of said toggle.

58. In a tack weighing machine, the combination of a scale pan, a delivery trough, a collector box interposed between the two and having a valve controlling the discharge therefrom, a toggle under control of the scale beam for holding said valve in the open position, a resetting device for said toggle, having, as an element, a frictionally driven cam, a stop for the frictional driving device, and means for tripping said stop when the valve-retaining toggle is broken to permit closing of the valve.

59. In a tack weighing machine, the combination of a scale pan having a discharge flap, a delivery trough, a collector box interposed between said trough and scale pan, a valve controlling the flow from the box into the pan, a toggle connected to said valve, a retaining device for said toggle under control of the scale beam, a cam disk and a pair of bars reciprocated thereby, one for operating the scale pan flap and the other for resetting the toggle which controls the collector box valve.

In testimony whereof I have signed my name to this specification, in the presence of two subscribing witnesses.

WILLIAM O. TAYLOR.

Witnesses:
 HAMILTON D. TURNER,
 KATE A. BEADLE.